United States Patent [19]

Bressler

[11] 4,269,312

[45] May 26, 1981

[54] APPARATUS FOR INFLATING A DEFLATED TIRE

[76] Inventor: Peter W. Bressler, 114 Naudain St., Philadelphia, Pa. 19147

[21] Appl. No.: 64,221

[22] Filed: Aug. 6, 1979

[51] Int. Cl.³ .................... B65D 85/04; B65D 85/68; F16K 16/20; B60C 23/10
[52] U.S. Cl. .................................. 206/303; 206/335; 206/409; 137/223; 152/415
[58] Field of Search ............... 206/303, 389, 409, 335; 152/414, 415; 137/223

[56] References Cited

U.S. PATENT DOCUMENTS

| 1,431,352 | 10/1922 | Abbott | 206/389 |
|---|---|---|---|
| 1,492,838 | 5/1924 | Dilweg | 152/414 |
| 2,227,601 | 1/1941 | O'Brien, Jr. | 137/223 |
| 2,237,559 | 4/1941 | Jenne | 152/415 |
| 2,579,131 | 12/1951 | Tinsley | 206/409 |

*Primary Examiner*—William T. Dixson, Jr.
*Attorney, Agent, or Firm*—Seidel, Gonda, Goldhammer & Panitch

[57] ABSTRACT

The apparatus includes a flexible hose having a first fitting at one end for attachment to a deflated tire and a second fitting at the other end for attachment to an inflated tire from which air is to be transferred to the deflated tire. The second fitting has a spring biased check valve for cutting off flow from the inflated tire to the deflated tire when the pressure entering the second fitting is below a predetermined level.

6 Claims, 3 Drawing Figures

APPARATUS FOR INFLATING A DEFLATED TIRE

BACKGROUND

Devices for inflating a deflated tire from another inflated tire are known. For example, see U.S. Pat. Nos. 1,492,838; 2,237,559 and 2,227,601. None of the devices disclosed in said patents have met with any substantial commercial success. After studying the prior art, I have noted that they suffer from one serious defect. If the deflated tire has a hole in it, the devices in the prior art will facilitate transfer of all of the air from the inflated tire to the deflated tire whereby there will now be two deflated tires. Another defect of the prior art is the lack of any convenient packaging for the device. These and other problems associated with the prior art are solved by the present invention.

SUMMARY OF THE INVENTION

The present invention is directed to apparatus for inflating a deflated tire or other device from an inflated tire or other source. The apparatus includes a length of flexible hose having a first hollow fitting at one end for attachment to a deflated tire and a second hollow fitting at the other end. The second hollow fitting has an inlet for connection to an inflated tire or other source of air under pressure. The second fitting includes a spring biased check valve for cutting off flow from the inlet to the hose when the pressure entering the inlet is below a predetermined level.

It is an object of the present invention to provide apparatus for inflating a deflated tire or other device from an inflated tire or other source which will automatically cut off flow when the pressure falls below a predetermined level.

It is another object of the present invention to provide a novel apparatus of the type involved herein with a unique packaging which renders the device more attractive, protects the device when not in use, and wherein the packaging is reusable.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
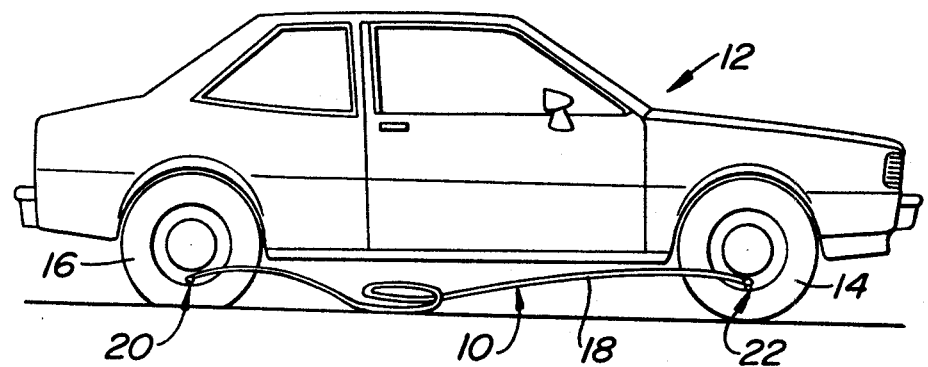
FIG. 1 is a side elevation view of an automobile and an operative disposition of the apparatus of the present invention.

Referring to the drawings in detail, wherein like numerals indicate like elements, there is shown apparatus in accordance with the present invention designated generally as 10 for use in connection with an automobile designated generally as 12. As illustrated in FIGURE 1, the apparatus 10 is being utilized to transfer air from an inflated tire 14 to a deflated tire 16.

The apparatus 10 includes a length of flexible hose 18. The length of hose 18 preferably has a length of about 8 to 12 feet whereby it may be utilized to interconnect any pair of tires including the spare tire in the trunk of the automobile. Hose 18 is preferably made from a flexible polymeric plastic material. A first fitting 20 is secured to a first end of the hose 18 and a second fitting 22 is secured to the other end of the hose 18.

The first fitting 20 is hollow and is adapted to be attached to the deflated tire 16. Fitting 20 includes a cylindrical cap 24 having threads or other attachment means on its periphery for attachment to a stem of the tire 16. Cap 24 is rotatably supported by a hollow head 26 having a stem in direct communication with the adjacent end of the hose 18. Head 26 has a projection 28 for contacting the valve within the stem on tire 16. Thus, as the cap 24 is threaded or otherwise attached to the stem on tire 16, the projection will open the valve whereby tire 16 will be in direct communication with hose 18.

The fitting 22 is preferably a cylindrical body 30 having an inlet 32 at one end. Within the inlet 32, there is provided an axially disposed projection 34 for contacting and opening the valve on the inflated tire 14. The body 30 has a flow passage 36 extending from the inlet 32 to an outlet chamber 38. Outlet chamber 38 communicates with the adjacent end of hose 18 by way of stem 40.

Figure 2:
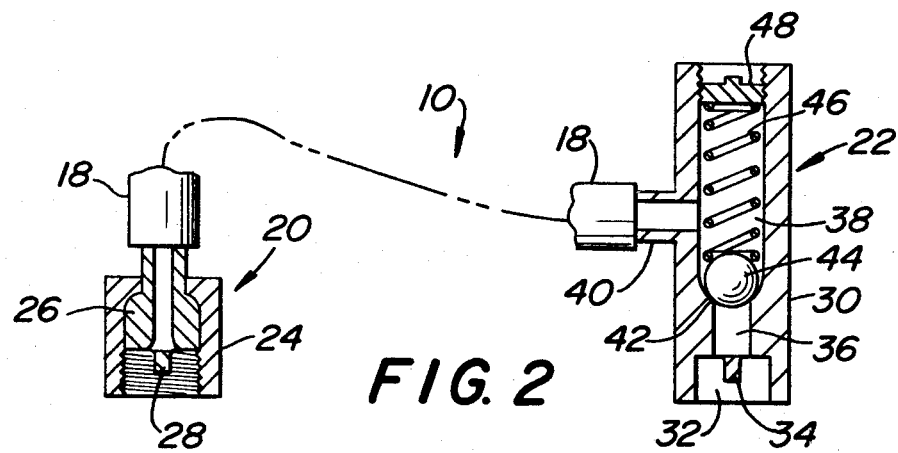
FIG. 2 is a longitudinal sectional view through the apparatus of the present invention.

At one end of the passage 36, there is provided a seat 42 for a check valve member such as ball 44. Ball 44 is biased to a closed position as shown in FIG. 2 by spring 46. A spring tension adjustment means 48 is threaded to the inner periphery of the outlet chamber 38 to facilitate adjustment of the tension on spring 46.

Figure 3:
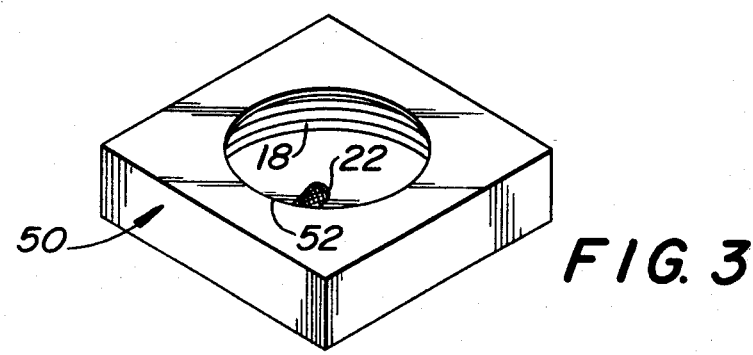
FIG. 3 is a perspective view of packaging containing the apparatus of the present invention.

As shown more clearly in FIG. 3, the apparatus 10 is packaged within a container 50. Container 50 is made from polymeric plastic, paperboard, or other suitable material so as to be relatively stiff. Container 50 is preferably a rectangular housing having only a single hole 52 on one major face thereof with a substantial diameter for the hole 52. A suitable diameter for hole 52 is 7 to 10 centimeters. The apparatus 10 is coiled within the container 50 and may be readily removed or reinserted therein by way of the hole 52. Container 50 facilitates storing the apparatus 10 within the trunk of an automobile or other location in a manner whereby the hose 18 and the fittings attached thereto are not readily exposed for damage or contact with other devices likely to be placed on top of the same.

The apparatus 10 may be utilized to inflate any one of a wide variety of inflatable devices from a source of pressurized air. For example, the apparatus 10 can be utilized to inflate a beach ball from the spare tire. Apparatus 10 is primarily designed for use in inflating a deflated tire utilizing air from one of the other inflated tires. In the event that the deflated tire 16 is deflated due to a puncture, the check valve will automatically close when the pressure of the air flowing from the inlet 32 to the hose 18 falls below a predetermined level. A suitable level attained by adjusting the tension of spring 46 is 15 psi.

The apparatus 10 will thus terminate flow of air from tire 14 to tire 16 when tire 14 has been deflated to a pressure such as 15 psi. In this manner, if tire 16 is punctured, all of the air will not be permitted to be withdrawn from tire 14. Without the check valve, and if tire 16 has a puncture, the prior art devices would result in both tires 14 and 16 being deflated.

In the preferred embodiment, only one of the fittings 20, 22 includes means for attaching the fitting to the stem of a tire. As illustrated, cap 24 has threads on its inner periphery. Hence, in use, the fitting 22 is attached to the stem on tire 16. Thereafter, the operator holds fitting 22 and manually maintains the projection 34 in contact with the stem valve on tire 14 until the tire 16 has been inflated sufficiently to drive to a garage. As soon as the operator ascertains that no more air is flowing from tire 14 to tire 16, the fitting 22 is raised out of contact with the stem on tire 14. Ball 44 immediately seats under the effect of spring 46 and the pressure within outlet chamber 38. Thereafter, the cap 34 may be unthreaded from the stem on tire 16 without fear of loss of air from the tire 16.

The present invention may be embodied in other specific forms without departing from the spirit or essential attributes thereof and, accordingly, reference should be made to the appended claims, rather than to the foregoing specification, as indicating the scope of the invention.

I claim:

1. Apparatus for inflating a deflated device from a source of air comprising a length of flexible hose having a first hollow fitting on one end and a second hollow fitting on the other end, one of said fittings having means for attachment of the fitting to one of the device to be inflated and the source of pressurized air, said second fitting having an inlet and means adjacent to the inlet for opening a valve in a source of pressurized air, a spring biased check valve in said second fitting for cutting off flow from said inlet to said hose when the pressure entering said inlet is below a predetermined level.

2. Apparatus in accordance with claim 1 wherein said attachment means is part of said first fitting, said hose communicating with said second fitting at an outlet chamber, said check valve including a valve member cooperating with a seat between said outlet chamber and said inlet.

3. Apparatus in accordance with claim 1 including a spring for biasing said check valve, and means on said second fitting for adjusting the tension of said spring.

4. Apparatus in accordance with claim 1 including a storage container, said container having a hole in a major face thereof, said hose and fittings being disposed within said container, said hose and fittings being introduced and removed as a unit from said container by way of said hole.

5. Apparatus for inflating a deflated tire from an inflated tire comprising a length of flexible hose having a first hollow fitting attached to one end and a second hollow fitting attached to the other end, each fitting being in communication with said hose, said first fitting having means for attachment to a tire stem of a deflated tire, said second fitting having an inlet and means within said inlet for opening a valve from a tire stem on an inflated tire, said second fitting having a flow passage providing communication between said inlet and an outlet chamber, a check valve member within said outlet chamber, a spring within said outlet chamber biasing said check valve member against the seat to control flow between said flow passage and said outlet chamber, said outlet chamber communicating with said hose, whereby said check valve member will cut off flow from said inlet to said hose when the pressure entering said second fitting inlet is below a predetermined level.

6. Apparatus in accordance with claim 5 including a container having transverse dimensions exceeding its height, a major face of said housing having a hole therein, said hose and fitting being coiled within said container, said hose and fittings being insertable into the container and removable from the container by way of said hole.

* * * * *